United States Patent
Schwartz et al.

[11] Patent Number: 5,999,703
[45] Date of Patent: *Dec. 7, 1999

[54] COMPUTER PROGRAM PRODUCT FOR MODIFYING THE BLACK CHANNEL OF AN OUTPUT DEVICE PROFILE WITHOUT ALTERING ITS COLORIMETRIC ACCURACY

[75] Inventors: Michael S. Schwartz, Belmont; Robert F. Poe, Charlestown, both of Mass.

[73] Assignee: Eastman Kodak Company, Rochester, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/825,039

[22] Filed: Mar. 27, 1997

[51] Int. Cl.$^6$ .............................. B41B 15/00; H04N 1/46; G03F 3/08; G06K 9/00

[52] U.S. Cl. .......................... 395/109; 395/109; 358/500; 358/529; 358/520; 358/518; 382/163; 382/167

[58] Field of Search ..................................... 358/500, 529, 358/520, 518; 382/163, 167; 395/109

[56] References Cited

U.S. PATENT DOCUMENTS

| | | |
|---|---|---|
| 5,359,436 | 10/1994 | Dichter et al. . |
| 5,502,579 | 3/1996 | Kita et al. ................................ 358/518 |
| 5,553,199 | 9/1996 | Spaulding et al. ...................... 395/109 |

*Primary Examiner*—Edward L. Coles
*Assistant Examiner*—Twyler Lamb
*Attorney, Agent, or Firm*—David M. Woods

[57] ABSTRACT

This is a method for adjusting output device profiles for four-color devices such as offset presses. The user of this invention starts by selecting a base profile. This base profile produces satisfactory color but does not have the desired amount of Gray Component Replacement (GCR). The user of this invention makes use of this invention to adjust the GCR of the output profile until it is at some desired level. The invention then produces a new output profile which produces the same color as the base profile but which has the desired degree of GCR.

12 Claims, 4 Drawing Sheets

5,999,703

COMPUTER PROGRAM PRODUCT FOR MODIFYING THE BLACK CHANNEL OF AN OUTPUT DEVICE PROFILE WITHOUT ALTERING ITS COLORIMETRIC ACCURACY

CROSS-REFERENCE TO RELATED APPLICATIONS

The present application is related to commonly assigned and concurrently filed U.S. patent application Ser. No. 08/825,137, filed Mar. 27, 1997, by Robert Poe and Scott Gregory, entitled, "Multi-colorant Process Control".

FIELD OF INVENTION

The invention relates generally to die field of color reproduction, and in particular to the process of producing hardcopy output on a four-color device from a digital image. More specifically, the invention relates to a method and apparatus for adjusting the amount of black ink called for by a device profile used in producing hardcopy outputs on an output device.

BACKGROUND OF THE INVENTION

This invention has to do with the field of color reproduction in general and, in particular to the process of producing hardcopy output on a four-color device from a digital image. Examples of four-color devices are: offset lithography in which the "four-color process" employs printing inks as colorants applied to paper, in a halftone screen pattern, by a printing press; gravure printing, which also employs printing inks applied to paper, off-press proofing systems, which employ toners as colorants to simulate the effect of an offset press; and computer-driven printers, which use a variety of technologies and colorants, such as jettable inks, toners, and dyes, applied in various continuous-tone, halftone, or dithered patterns.

These processes use three chromatic colorants which are commonly chosen to be the subtractive primaries cyan, magenta, and yellow (abbreviated as C, M, and Y). In addition, they may use an achromatic, or black, colorant (abbreviated as K).

In order to print digital images on these devices, it is necessary to be able to convert colors among different device color spaces. For example, consider a person who wishes to scan in a picture, view the picture on a monitor, and then write out the picture on a four-color offset press. In order to do this in such a way that the original picture, monitor image, and printed copy look the same, it is necessary to convert between the color spaces defined by the RGB measured by the scanner, the RGB used by the monitor, and CMYK used by the press. In order to produce this conversion, color management systems have been developed by a number of companies. These color management systems use device profiles to describe the colorimetric properties of devices. Each profile contains transformations between the device color space (i.e., the space defined by the amounts of each colorant used by the device) and a profile connection space (PCS). Standard choices for the PCS are the CIELAB and CIEXYZ color spaces defined by the International Commission on Illumination (CIE). In addition, profiles for output devices contain a simulation transform which maps from the PCS to the PCS for describing how out of gamut colors are mapped into the gamut of the output device before being printed. Thus each profile contains the following transforms:

(a) an input transform which maps the device color space to the profile connection space;
(b) an output transform which maps the profile connection space to the device space;
(c) a simulation transform which maps the PCS to the PCS, and describes how colors which are outside the gamut of the device are to be printed; and
(d) a gamut alarm transform which maps the PCS to a single number and indicates whether or not a given color is within the gamut of the device.

The format for these profiles has been standardized by the International Color Consortium (ICC). A number of companies have produced and sold profiles which conform to this standard, and have also produced and sold applications which create ICC conforming profiles from measurement data. Thus, each owner of color processing equipment has available an increasing number of profiles from an increasing number of different sources.

In the case of a four-color device, such as an offset press, the output transform is not determined solely by the calorimetric properties of the output process. These processes are undetermined or, in other words, most printable colors can be printed with a variety of different combinations of cyan, magenta, yellow, and black colorants (CMYK). In general, these options can be thought of as different balances between the amount of black colorant (K) and the amount of a neutral combination (CMY) of the primary colorants. Since the printed colors are (or can be) identical, the choice among these options is made, not on the basis of colorimetry, but according to considerations of process control and repeatability, limits of the printing technology, cost, aesthetic taste, and the like. Some of the common approaches to the usage of K versus CMY are referred to in the art as Under-Color Removal (UCR) and Gray-Component Replacement (GCR).

Under current methods of generating profiles for output devices, the choice of GCR is one component of the process for generating the profile. An operator writes out a set of patches; measures those patches with a colorimeter; and gives those measured values to a computer program. The operator also gives parameters specifying the desired degree of GCR to that program. The computer program then uses the measured data and the choice of GCR to compute the profile. If the operator wishes a different amount of GCR, it is necessary to re-run the program. This is not too inconvenient if the operator has access to the software and to the measurement data which had been used in creating the output profile. However, in many cases, a person might own a profile which was generated by somebody else. In those cases there isn't any current method for the owner of such a profile to change its level of GCR.

U.S. Pat. No. 5,359,436 by Dichter discloses a method of recomputing black for a picture which has had its CMY values readjusted. This patent, however, does not base its recomputation of black ink on a colorimetric model for a specific output device so that the recomputation is characteristic of that device. Rather it assumes a simple standardized model for how black is replaced by cyan, magenta, and yellow. Thus, it cannot, in general, guarantee that the color of a picture will be the same after the black ink has been recomputed.

Consequently, a need exists for improvements in the presently known and utilized method and apparatus for constructing a profile for a four-color output device.

ADVANTAGEOUS EFFECT OF THE INVENTION

The present invention has the following advantages. It permits any person who owns a device profile characterizing a four-color output device to modify the way in which the profile balances black ink against the other colorants. It does this without destroying the validity of the profile as a characterization of that output device. It permits the owner of the profile to make this modification even if there isn't any access to the original characterization data that the profile is based on. By using the present invention, a person preparing color separations for use on a four-color press can adjust the amount of black ink called for by an output profile so as to optimize the performance of the press when it prints pictures made with that profile.

SUMMARY OF THE INVENTION

It is the object of the current invention to enable any person who owns an output profile for a four-color device to change the GCR level for that profile, without changing the colorimetry for that profile.

It is a further advantage of the present invention that the new profile compresses unprintable colors into the gamut of the output device in a way which is similar to the gamut compression used by the base profile.

DETAILED DESCRIPTION OF THE INVENTION

In the following description, the present invention will be described in the preferred embodiment as a software program. Those skilled in the art will readily recognize that the equivalent of such software may also be constructed in hardware.

Still further, as used herein, computer readable storage medium may comprise, for example; magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 1:
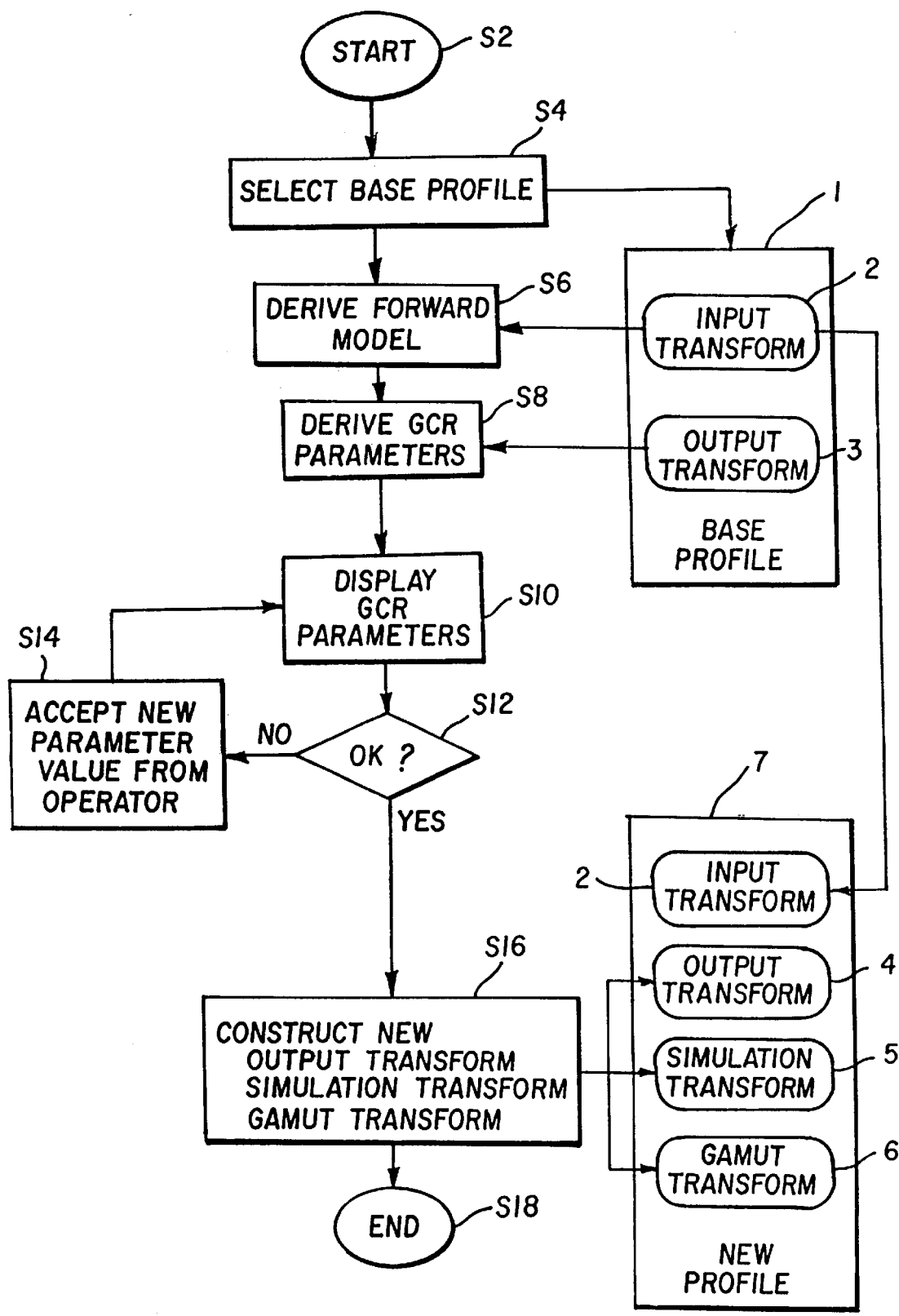
FIG. 1 shows the steps in computing the modified profile from a base profile.

Referring to FIG. 1, an overview flowchart of the software program of the present invention is illustrated which software is designed to operate on ICC profiles. It is instructive to note that, for example, the owner of a printing press will typically have a plurality of base profiles for that device or for similar devices, which profiles may be stored on computer readable storage medium. The user selects a desired base profile 1 for the output device. The software is initiated S2 and then reads S4 in the selected base profile 1. A mathematical model is derived S6 from the input transform 2 of this profile 1 for describing the relationship between the amount of ink used in the output device and the resulting color. This model will be referred to as the "forward model" for the output device. The next step is to use the output transform 3 from the selected base profile 1 to construct a mathematical model describing the relationship between black and colored ink in the base profile S8. The parameters derived for that model constitute a description of the current level of GCR. At this point the user is shown a set of control panels (shown in FIGS. 2 and 3) which displays the current level of GCR in the profile S10. If the user does not like the parameters S12, a new set of parameters may be selected S14. The user may repeatedly modify the parameters (steps S10–S14) to re-modify the parameters, as will be obvious to those skilled in the art. Once the user has determined the desired amount of GCR, the process uses the derived forward model and the user-specified GCR parameters to produce S16 new output 4, simulation 5 and gamut 6 transforms, as described in detail herein below. These new transforms are combined with the original input transform 2 to produce a new device profile 7. The input transform 2 does not have to be changed because the input transform 2 depends only on the colorimetric characterization of the device, which does not change. The user may then exit S18 the program.

In regard to step S6, the forward model is a mathematical model describing the colorimetric properties of the output device. Such a model typically has a number of free parameters. In conventional systems, the user writes out a set of patches on an output device and measures the color of those patches using a color measurement device. The parameters of the forward model are then adjusted so that the resulting model does a satisfactory job of predicting those measured colors of a set of patches. In the current invention, the parameters are adjusted so that the resulting model gives good agreement with the input transform from the selected base profile. One way of doing this adjustment is to calculate a set of virtual patches. The patch values can be chosen to cover CMYK space. The "measured values" for these patches can be computed by processing the patch values using the input transform 2. Applying the input transform 2 to the CMYK values for each virtual patch gives the color values that would have been measured for those patches if they were actually written out. The model parameters can then be adjusted using regression techniques so that the model maps the patch values to the artificial measured values, as in a conventional process.

The exact nature of the forward model is not important for this process. The model can be a polynomial in cyan, magenta, yellow, and black ink. It could also be a piecewise polynomial function with each piece representing a subset of CMYK space.

Figure 4:
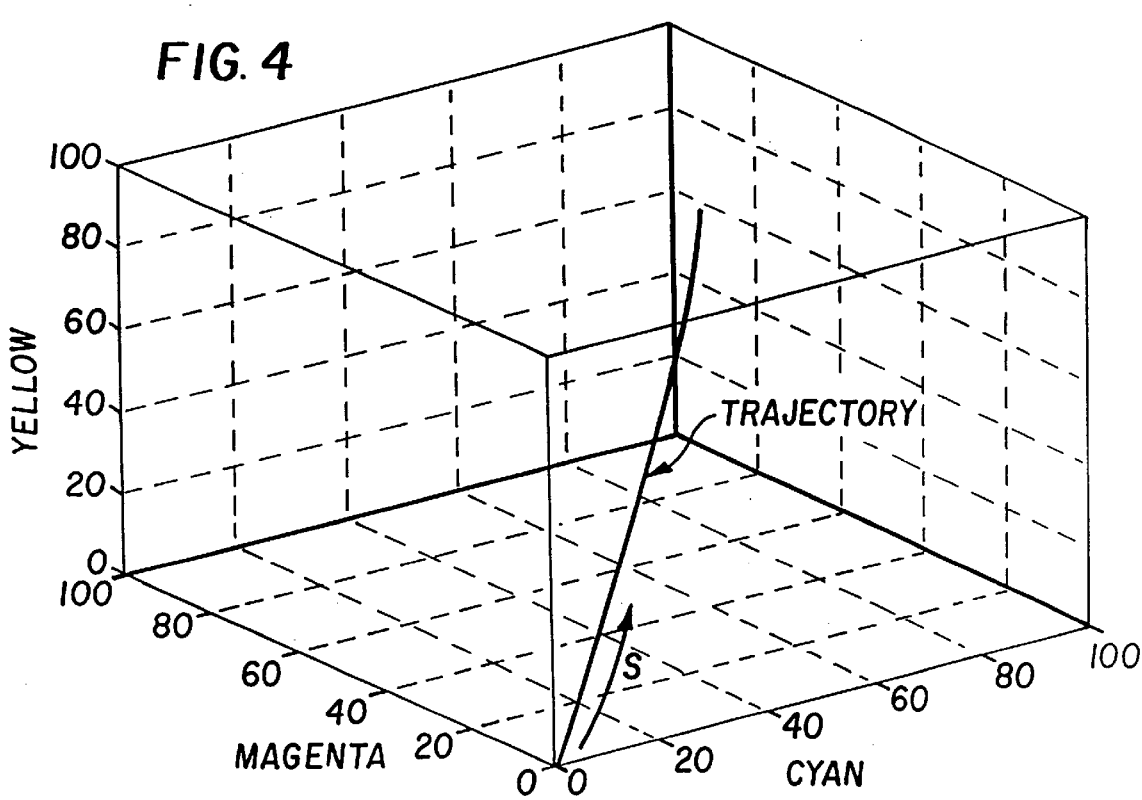
FIG. 4 is a plot illustrating a definition of a path-length parameter "s"

In regard to step S8, the ability to derive the current level of GCR in the base profile is important for assuring the usability of this invention. A user might want to only slightly modify a base profile. The current invention determines the current GCR settings by evaluating the output transform of the selected base profile at various colors and examining the balance of cyan, magenta, yellow, and black inkings at those colors. For example, one important determining factor for GCR is the amount of black ink used in printing grays. This is determined by the amount of black ink as a function of colored ink along the neutral axis— the line in color space where colors are neutral (For example in CIELAB space it is the line where a*=b*=0.) The current invention derives this by evaluating the output transform on a set of neutral colors going from white to black and then examining the results of that evaluation. Referring to FIG. 4, the C, M, and Y components define a trajectory in a 3-dimensional space. The path length along that trajectory, computed by numerical integration, can be used as an independent parameter, called s. The individual components can then be expressed as functions of that parameter, C(s), M(s), Y(s), and K(s). These functions then approximate the behavior of the inks for neutral colors in the base profile; they can be represented mathematically in various ways—for instance, by splines. This representation is chosen to facilitate changes requested by the user. For instance, the user can modify K(s) by direct interaction with the user interface. C(s), M(s), and Y(s) can be modified, to a limited degree, by adjusting the total area covered limit or TAC limit, (the maximum value that the sum of the four inks that can be used at a given point of the printing media). As s increases, the ink values and the sum of the ink values increase. Thus, changing the TAC limit is equivalent to changing the maximum value of s; as the TAC limit changes, the spline curves are truncated or extrapolated to a point where the new TAC limit is satisfied.

Another important factor is the behavior of the inks in saturated colors (non-neutral colors). This can be formulated in many ways one of which is through the use of a single parameter called GCR slope. This parameter will be defined in more detail herein below. In general, the behavior at saturated colors can be determined by evaluating the output transform at one or more non-neutral colors.

Figure 2:
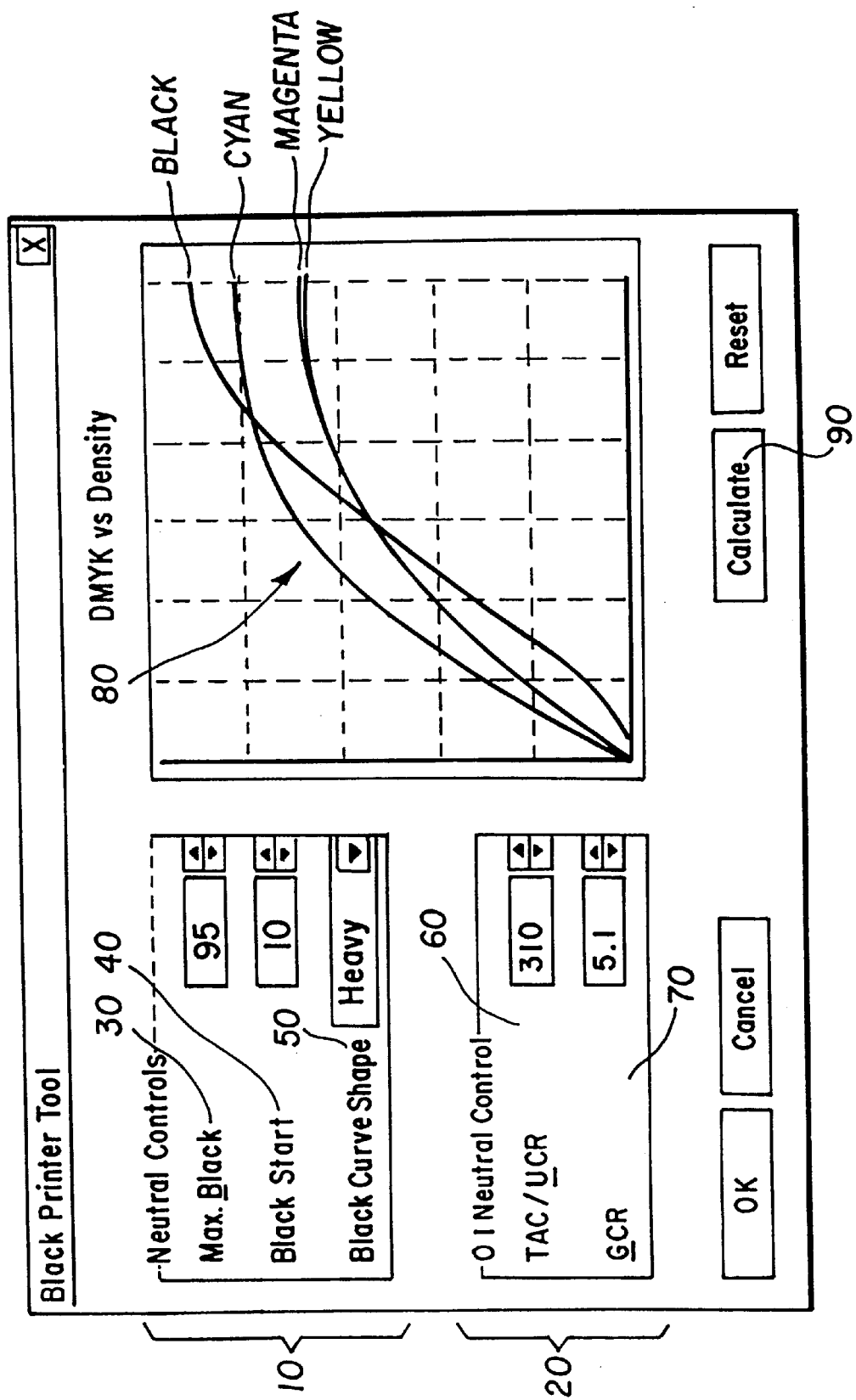
FIG. 2 shows a computer interface which is used by one embodiment of this invention and which allows an operator to adjust various GCR parameters.
Figure 3:
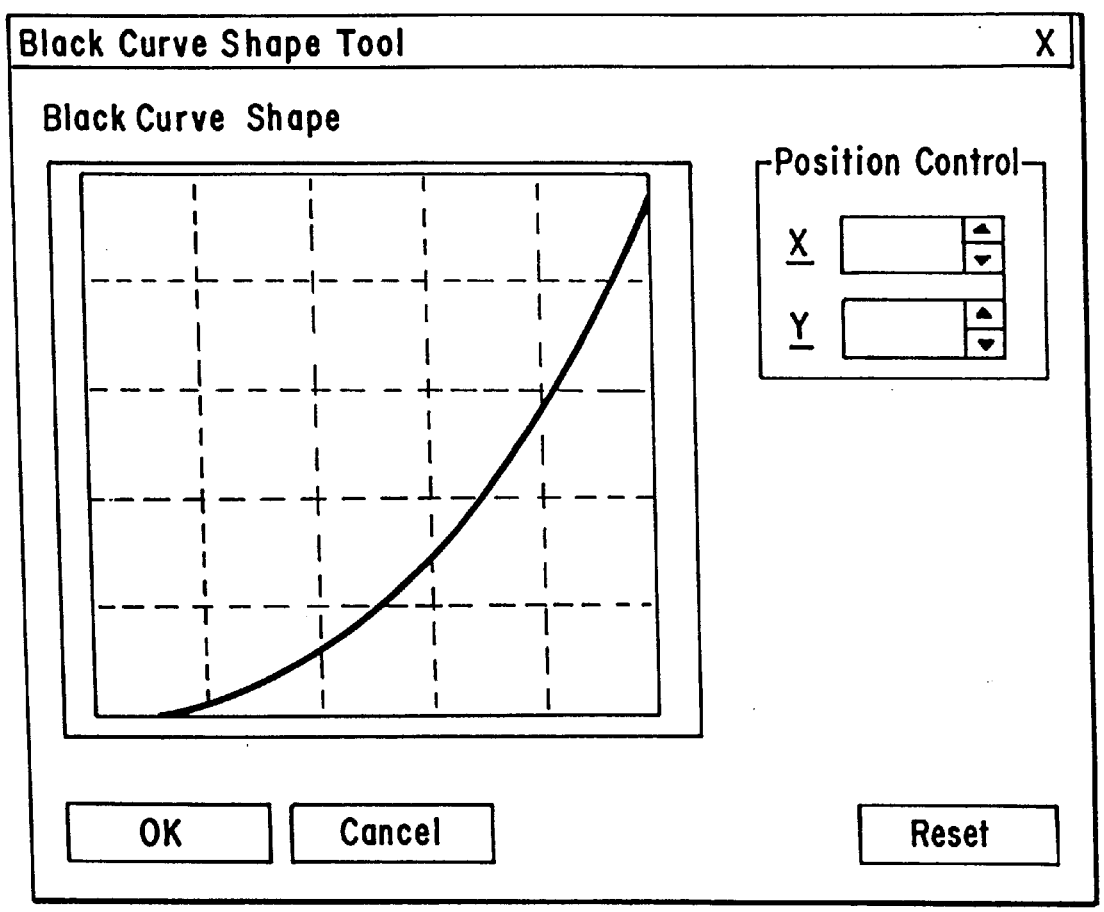
FIG. 3 shows a computer interface which is used by one embodiment of this invention and which allows an operator to adjust the amount of black ink along the neutral axis.

Referring to FIGS. 2 and 3, and in regard to steps S10–S14, control panels are shown which allow a user to adjust the parameters which determine the GCR. FIG. 3 shows a control panel which allows the user to examine and modify the amount of black ink as a function of process ink along the neutral axis (K(s)). The control panel in FIG. 2 organizes the GCR parameters into two groups—those which are defined in terms of their effect on the behavior in neutral colors 10, and those which effect behavior more generally 20. The neutral controls 10 are the maximum amount of black ink allowed 30, the minimum of process ink which must be present before any black is used 40, and the amount of curvature to be used in setting black as a function of process ink 50. These parameters determine the curve K(s) described above through the following equation.

$$\text{if}(s < \text{BlackStart})$$
$$K(s) = 0$$
$$\text{else}$$
$$K(s) = \text{MaxBlack} *$$
$$\text{GCRCurve}((s - \text{BlackStart}) / (\text{smax} - \text{BlackStart}))$$

Figure 5:
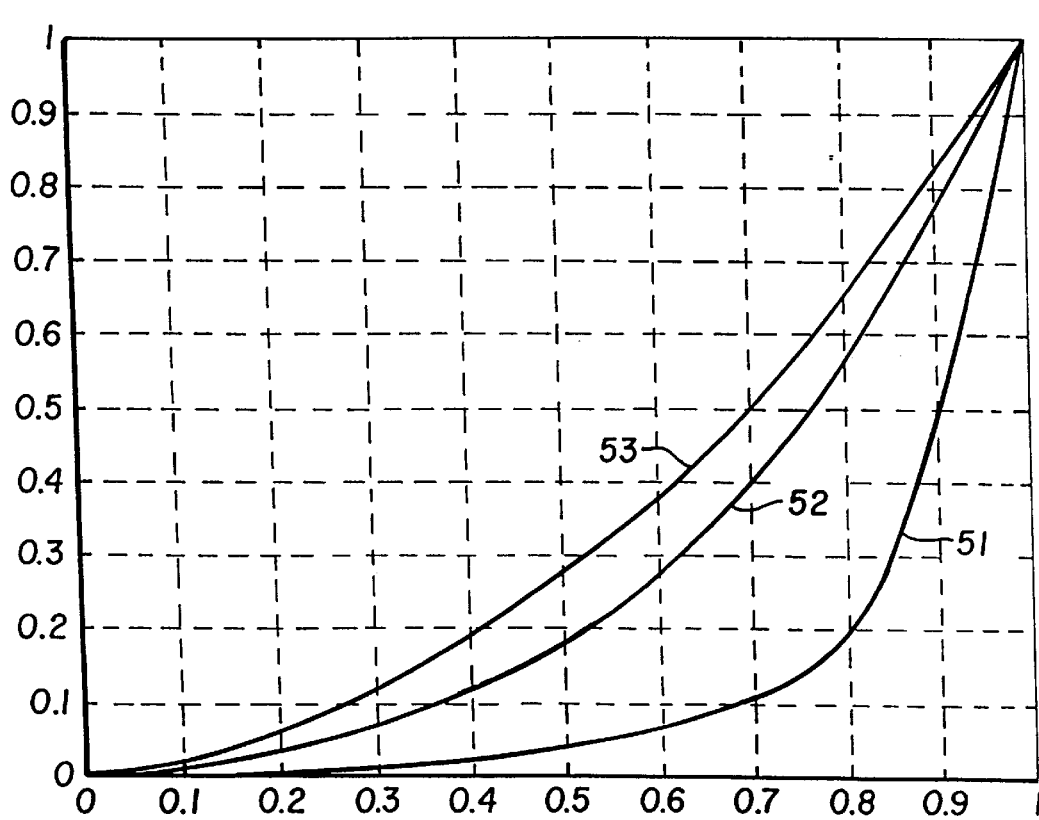
FIG. 5 is a plot illustrating the three curves used in computing light, medium and heavy GCR curves.

Eq. 1

Where smax is the maximum value of s, and GCRCurve is a low order curve mapping [0-1] to [0-1] whose curvature depends on the choice of Light, Medium, or Heavy of Black Curve Shape 50. FIG. 5 illustrates the values of GCRCurve for light 51, medium 52 and heavy 53.

If a user does not wish to specify the neutral aim curve K(s) using the parameters in Eq. 1, the user also has the option of drawing a neutral aim curve directly using the control panel, an example is shown in FIG. 3. Referring back to FIG. 2, the general controls include the Total Area Covered (TAC) or the maximum value allowed for the sum of the inks 60; and a GCR value (GCR slope) 70, which indicates how rapidly black is removed from a color as that color gets more saturated. A plot 80 shows the amount of each ink at neutral as a function of density. This plot 80 helps a user understand the consequences of any particular choice of parameters. The plot 80 is updated every time the user hits the Calculate button 90. The updated plot is computed by using the current parameters to compute inkings at several points along the neutral axis using the methods described below.

In regard to step S16, once the operator has set the GCR parameters and the output gamut has been adjusted, as described below, to reflect the new levels of black ink, the invention can compute a new output transform. The first step in adjusting the output gamut is to determine the gamut for the desired inkings. This new gamut is different from the base gamut for the selected profile because the amount of black ink used and the value of the maximum total ink allowed effect the dynamic range of the printing process. Determining the new gamut is done using the following steps: first, the present invention generates a set of ink values which encompass the range of inkings allowed for by the operator's choices, and applies the forward transform to those inkings to produce a set of points in the CIELAB color space; second, the present invention sorts the color points by their L* values and then divides the range of L* values into a set of intervals. Finally, for each L* interval, it determines a perimeter in a* and b* which encloses the points within that L* interval. At this point, the invention can use its knowledge of the location of the boundary of the new gamut to compute a new gamut alarm transform.

Once it has determined the gamut, the present invention can compute the output transform. The output transform is encoded as a three-dimensional interpolation table. Each grid point of the table represents a color in the profile connection space. Therefore for each grid point of that table, the invention must find an inking to associate with the color represented by that grid point. It does this for each color as follows. First it maps the color into the gamut of the output device. It does this mapping in two steps. First it uses the selected base profile to map the grid color into the base gamut. Then it applies a mapping to the result which maps the base gamut into the new gamut. The first remapping can constitute a large change, especially for bright, saturated colors. The second remapping will in general be a small change which mostly effects the darker colors. In this way the new gamut compression function mostly retains the character of the gamut compression function associated with the base profile. This is important because there is no canonical "best way" for compressing gamuts; each profile manufacturer has its own philosophy. A user who only wished to change GCR would not be pleased if the resulting profile also produced different results for bright, saturated colors.

Once the process has found a remapped color, it finds an inking (CMYK) such that the forward model sends that inking to the remapped color, and such that the values C,M,Y and K satisfy the various constraints and relationships specified by the GCR parameters.

The current implementation computes the output transform at each grid point in the following way. First, it maps the grid-point color into the new gamut of the output device. The grid-point color is converted to ink using the base output transform; the resulting inking is then passed through the forward model to determine its color, which (by definition) is in the original gamut. However, since the new gamut may be different, as described above, an adjustment to this color may be necessary. The luminance, or tone, of this color can be adjusted according to the change in the dynamic range of the process; this can be a simple re-scaling of the luminance to the new minimum and maximum luminance values or it can involve a more subtle reshaping of the tone-reproduction characteristic of the process. The adjusted color may still be outside the new gamut. In that case, it can be adjusted in saturation by mapping it to a color on the gamut surface of approximately the same hue. This saturation adjustment is facilitated by the previous determination of the gamut. The color so adjusted is then regarded as the target color for the given grid point.

The process then determines a CMYK inking for the grid point which corresponds to the target color. In order to do this it must invert the forward model at the target color, while satisfying the constraint specified by the GCR parameters. The preferred embodiment does this using the method disclosed in the above referenced, commonly assigned U.S. Patent Application by R. Poe and H. S. Gregory. This method allows the invention to determined an inking by inverting an unconstrained mapping which goes from a three-dimensional space to a three-dimensional space. The method is based on a continuous mapping from a three-dimensional parameter space into the four-dimensional ink space. The mapping is based on the four functions, K(s), Y(s), M(s), and C(s), to establish the behavior for neutral colors. The mapping is further defined for non-neutral colors through the use of the GCR slope parameter. The function $g_{CMY}$ mentioned in above referenced, commonly assigned U.S. Patent Application by R. Poe and H. S. Gregory is represented in the present invention by a power-law curve with offset:

$$g_{CMY}(x)=(1+a)*x^p-a$$

for values of x in the interval [x0, 1]; for values of x in [0, x0] this form is replaced by a straight line tangent to the curve at x0. Here p is the GCR slope parameter. The offset a and the point of tangency x0 are determined so that $g_{CMY}(x0)$ equals a predetermined small constant, such as 0.05.

However many other methods of inverting a non-linear function while satisfying a constraint are known. These methods could also be used with this invention. The inking determined by this step is then encoded into the interpolation table of the new output transform.

The new simulation transform is computed by mapping each grid color through the new output transform and then by mapping each resulting output inking through the forward model.

The invention has been described with reference to a preferred embodiment, however, it will be appreciated that variations and modifications can be effected by a person of ordinary skill in the art without departing from the scope of the invention.

We claim:

1. A computer program product for changing a black inking specified by an output transform which is part of a pre-stored set of base transforms characterizing an output device, in which one of the set of transforms is an input transform, without changing the colorimetric accuracy of the transforms in the set, comprising: a computer readable storage medium having a computer program stored thereon for performing the steps of:

(a) deriving a forward model from the input transform rather than from a target written by the output device;

(b) accepting parameters specifying a desired level of black ink; and (c) constructing a new output transform which inverts the forward model so that the new output transform is consistent with the specified black inking parameters.

2. The computer program product as in claim 1 further comprising determining initial values for the parameters specifying a desired level of black ink from the output device transform.

3. The computer program product as in claim 1 further comprising providing a gamut compression function for the new profile which is computed by combining the gamut compression derived from the base transforms with a function which maps the pre-stored base gamut into the new gamut.

4. The computer program product as in claim 1, wherein the forward model is derived by using the input transform to generate virtual patches.

5. The computer program product as in claim 4, wherein the forward model is derived by using a polynomial.

6. The computer program product as in claim 1, wherein the parameters specifying the desired level of black includes a function K(s) in which K is the amount of black ink and (s) is the path length along a neutral trajectory in CMY color space.

7. The computer program product as in claim 1, wherein the black inking parameters include a GCR slope parameter which determines the behavior of black ink for non-neutral colors.

8. The computer program product as in claim 1 further comprising inverting the forward model by making use of a mapping from a three-dimensional parameter space to CMYK.

9. The computer program product as in claim 1, wherein the set of transforms are encoded as an ICC profile.

10. The computer program product as in claim 1, wherein a new gamut alarm transform is computed from the input transform and the parameters specifying a desired level of black ink.

11. The computer program product as in claim 6, wherein K(s) is approximated by a spline and the functions C(s), M(s), Y(s) giving the amount of colored ink along the parameter "s" are approximated by splines.

12. The computer program product as in claim 3, wherein the function which maps the base gamut into the new gamut comprises a luminance remapping which maps the luminance range characterizing the base gamut into the luminance range characterizing the new gamut, followed by a saturation remapping.

* * * * *